United States Patent [19]

Ikeda

[11] Patent Number: 4,955,303
[45] Date of Patent: Sep. 11, 1990

[54] LINEAR MOTOR FEEDER SYSTEM
[75] Inventor: Haruo Ikeda, Musashino, Japan
[73] Assignee: Railway Technical Research Institute, Tokyo, Japan
[21] Appl. No.: 321,801
[22] Filed: Mar. 10, 1989
[30] Foreign Application Priority Data
  Mar. 30, 1988 [JP] Japan .................................. 63-74492
[51] Int. Cl.⁵ ........................ B60L 13/00; H02K 41/00
[52] U.S. Cl. ...................................... 104/292; 318/38; 318/135
[58] Field of Search ............... 104/281, 286, 290, 292, 104/294, 298; 318/135, 687, 38, 625

[56] References Cited
U.S. PATENT DOCUMENTS

| | | | |
|---|---|---|---|
| 4,068,152 | 1/1978 | Nakamura et al. | 104/298 X |
| 4,348,618 | 9/1982 | Nakamura et al. | 104/290 X |
| 4,689,530 | 8/1987 | Nakamura et al. | 318/135 |

Primary Examiner—Robert J. Oberleitner
Attorney, Agent, or Firm—Armstrong, Nikaido, Marmelstein, Kubovcik & Murray

[57] ABSTRACT

The invention relates to a linear motor feeder system in which a linear motor is supplied with driving power from equipment on the ground. Divided armature coils are serially connected two by two to form sets of the armature coils, the junction between the two armature coils in each set is connected to one feeder and both ends of the set of armature coils are connected to two feeders via respective switches, and short-circuiting switches are connected between mutually adjacent ones of the feeders. By turning these switches ON and OFF in accordance with the position of a vehicle, the linear motor is driven by a single frequency converter connected across feeders which are in turn connected across both ends of the divided armature coils.

3 Claims, 8 Drawing Sheets

LINEAR MOTOR FEEDER SYSTEM

BACKGROUND OF THE INVENTION

This invention relates to the feeder system of a so-called ground linear motor in which a linear motor is supplied with driving power from equipment on the ground.

An arrangement is known in which a linear motor has a stator provided on the ground and a moving element provided on a vehicle, just as a rotary motor is provided with a stator and a rotor, with a propulsion force or regenerative braking force generated between the stator and the moving element being utilized to run a train. However, a striking difference between a linear motor and a rotary motor is that whereas the stator and rotor in the rotary motor are in full opposition to each other at all times, only a portion of the stator in the linear motor opposes the moving element at all times.

For the foregoing reason, the armature coil which is the ground stator in an LSM (linear synchronous motor) serves to generate a propulsion force only in the portion of the coil opposed by the LSM magnetic field on the vehicle. Even if a current is continuously passed through the other armature coil portion on the ground, this merely increases the power loss and invites a rise in the temperature of the ground armature coil and excessive expenditures. A feeder section changeover system is employed in order to prevent such wasteful power loss.

As shown in FIGS. 1(a) through 1(c), a ground armature coil is electrically divided at fixed distances and current is passed only through the section of the ground armature coil at which the train is present. More specifically, as shown in FIG. 1(a), when a vehicle VH is at the section A of the ground armature coil, a frequency converter FCA feeds the ground armature coil section A with electricity via a feeder LA. Then, when the vehicle VH passes from section A to section B of the ground armature coil, as shown in FIG. 1(b), a frequency converter FCB feeds the ground armature coil section B with electricity via a feeder LB, so that section B is fed in addition to section A of the ground armature coil. When the vehicle VH makes a complete transition to the section B of the ground armature coil, as shown in FIG. 1(c), feed of electricity is cut off from the ground armature coil section A and electricity continues to be fed solely to the section B of the ground armature coil.

In order to prevent a fluctuation from developing in the vehicle propulsion force when the sections of the ground armature coil are changed over in this manner, it is necessary to alternately connect the sections A and B of the ground armature coil to the feeders LA and LB, provide the two frequency converters FCA, FCB and successively change over the feed of electricity in conformance with the movement of the vehicle VH.

With this feeder system, therefore, the fact that two frequency converters FCA, FCB are required results in a complicated construction as well as higher installation and maintenance costs.

SUMMARY OF THE INVENTION

An object of the present invention is to provide a more simply constructed and more economical linear motor feeder system in which it is possible to supply driving power to a linear motor with use of only a single frequency converter.

According to the present invention, the foregoing object is attained by providing a linear motor feeder system in which divided armature coils are serially connected two by two to form sets of the armature coils, the junction between the two armature coils in each set is connected to one feeder and both ends of the set of armature coils are connected to two feeders via respective switches, and short-circuiting switches are connected between mutually adjacent ones of the feeders. By turning these switches ON and OFF in accordance with the position of a vehicle, a linear motor is driven by a single frequency converter connected across feeders which are in turn connected across both ends of the divided armature coils.

Other objects, features and advantages of the present invention will become more apparent from the following detailed description made in conjunction with the attached drawings.

DESCRIPTION OF THE PREFERRED EMBODIMENT

Figure 1A:
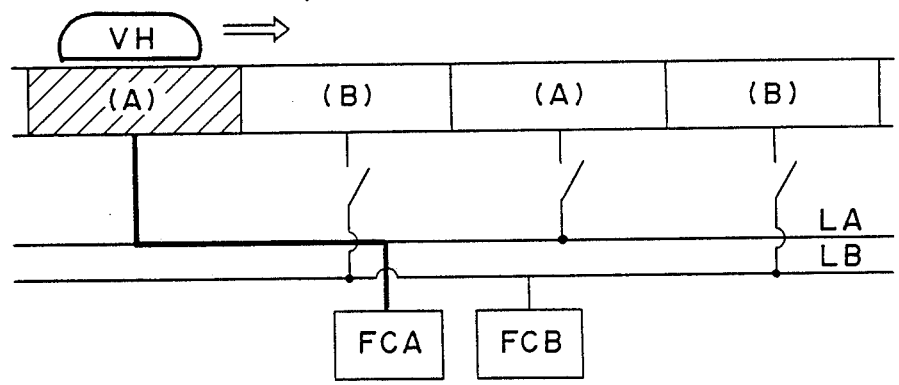
FIGS. 1(a) through 1(c) are views showing the construction of a linear motor feeder system according to the prior art.
Figure 1B:
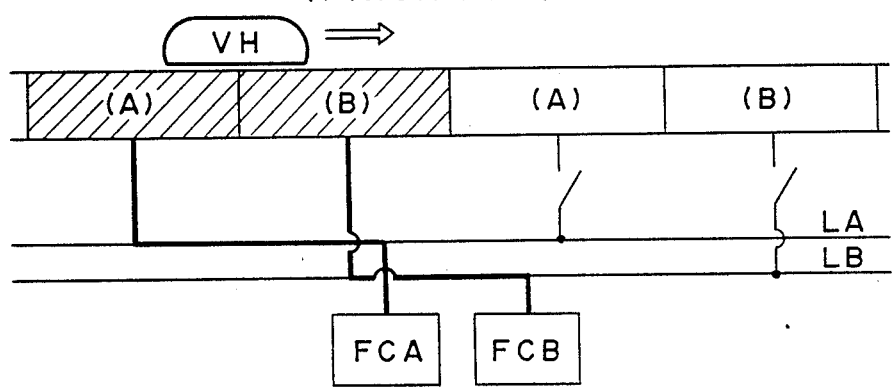
Figure 1C:
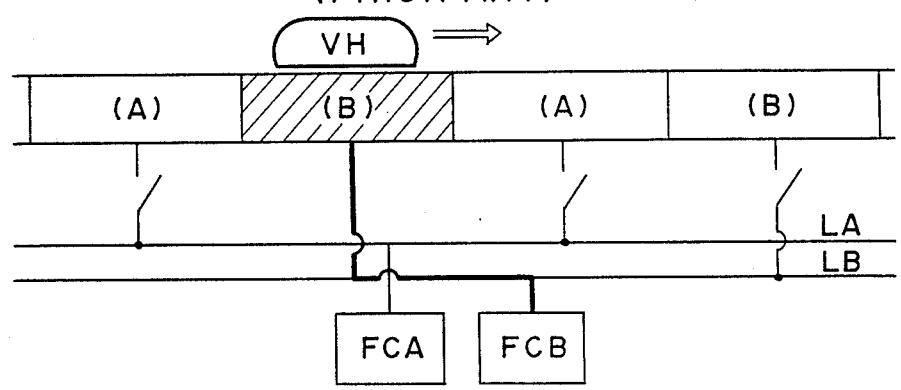
Figure 2:
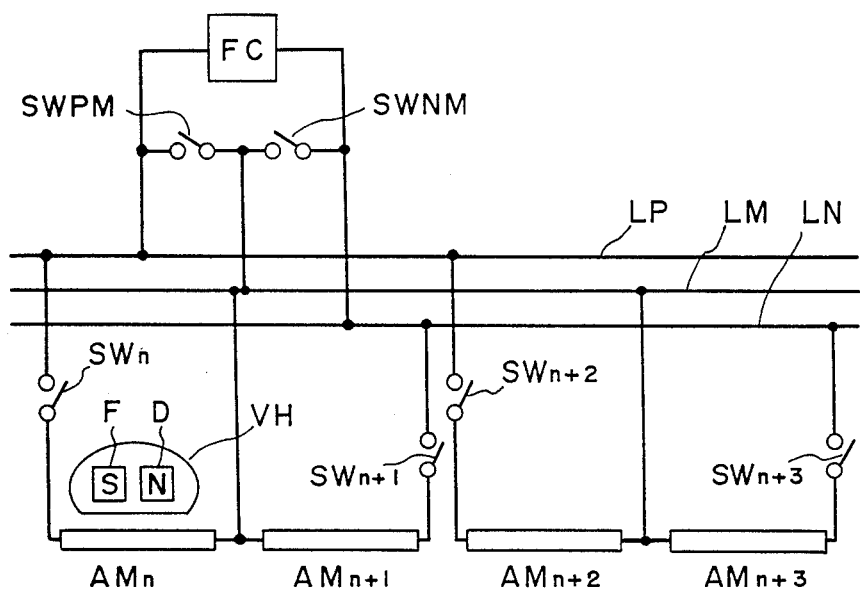
FIG. 2 is a view showing the construction of an embodiment of a linear motor feeder system according to the present invention.

FIG. 2 illustrates an embodiment of a linear motor feeder system according to the present invention. Here the system is composed of single-phase feeder circuits. A vehicle VH is provided with field poles FD excited to N and S poles. Ground armature coils $AM_n$, $AM_{n+1}$, $AM_{n+2}$ are electrically divided to have lengths greater than that of the vehicle VH. These armature coils are serially connected in twos. Armature coils $AM_n$, $AM_{n+2}$ are connected at one end thereof to a feeder LP via respective switches $SW_n$, $SW_{n+2}$, and armature coils $AM_{n+1}$, $AM_{n+3}$ are connected at one end thereof to a feeder LN via respective switches $SW_{n+1}$, $SW_{n+3}$. The junction between each pair of connected armature coils is connected directly to a feeder LM. A short-circuiting switch SWPM is connected across feeders LP and LM, and a short-circuiting switch SWNM is connected across feeders LN and LM. A frequency converter FC has its ends connected to the feeders LP, LN and supplies the armature coils with the power necessary for driving the vehicle. In a three-phase linear motor, there are three sets of single-phase ground electrical equipment, each set of equipment comprising an armature coil, a switch, a feeder and the frequency converter. Each set is electrically independent and forms a feeder circuit.

Figure 3:
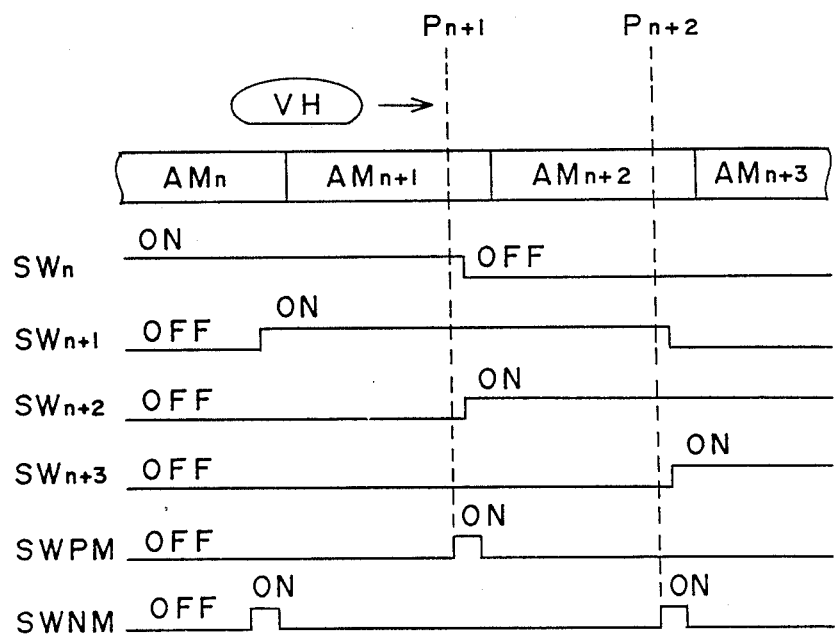
FIG. 3 is a time chart illustrating the operation of the feeder system of FIG. 2.

FIG. 3 illustrates the relationship between vehicle position and switch operation in the feeder system of FIG. 2. It is assumed here that the vehicle VH is traveling from left to right in the Figure.

Figure 4:
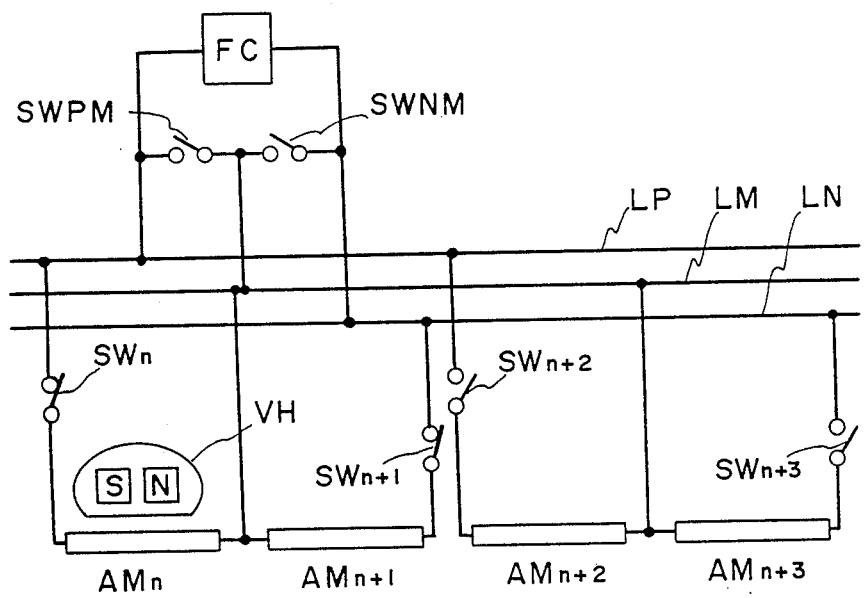
FIGS. 4 through 11 are views illustrating the manner in which feed of electricity to a linear motor is changed over according to an embodiment of the present invention.

When the vehicle VH is situated on the armature coil $AM_n$, as shown in FIG. 4, switches $SW_n$ and $SW_{n+1}$ are ON (closed) and all of the other switches are OFF (open). Under these conditions, the frequency converter FC feeds electricity through the following path: feeder LP→switch $SW_n$→armature coil $AM_n$ →armature coil $AM_{n+1}$→switch $SW_{n+1}$→feeder LN.

Figure 5:
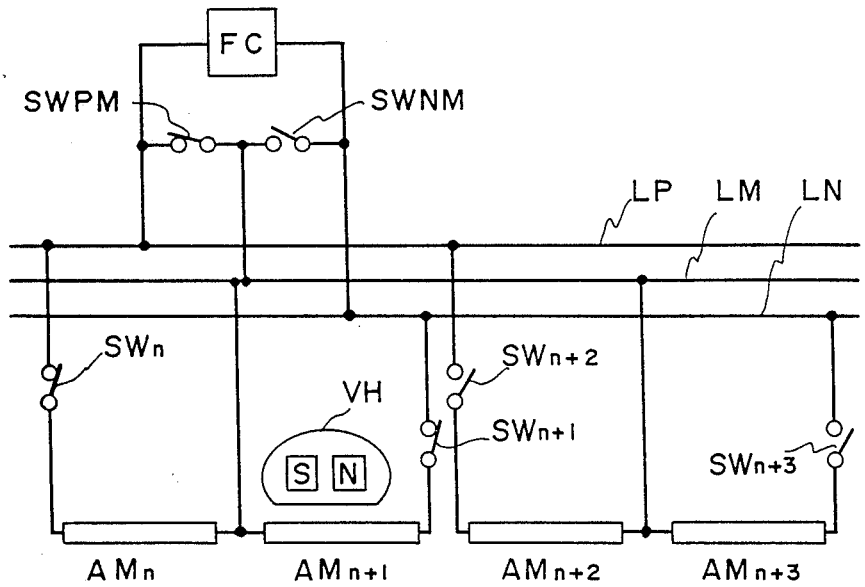

Next, at point $P_{n+1}$ (see FIG. 3) where the vehicle VH has moved in its entirety to the position of armature coil $AM_{n+1}$, as shown in FIG. 5, the switch SWPM is turned ON to short-circuit the feeders LP and LM. Under these conditions, the frequency converter FC feeds electricity through the following path: switch SWPM→feeder LM→armature coil $AM_{n+1}$→switch $SW_{n+1}$→feeder LN.

Figure 6:
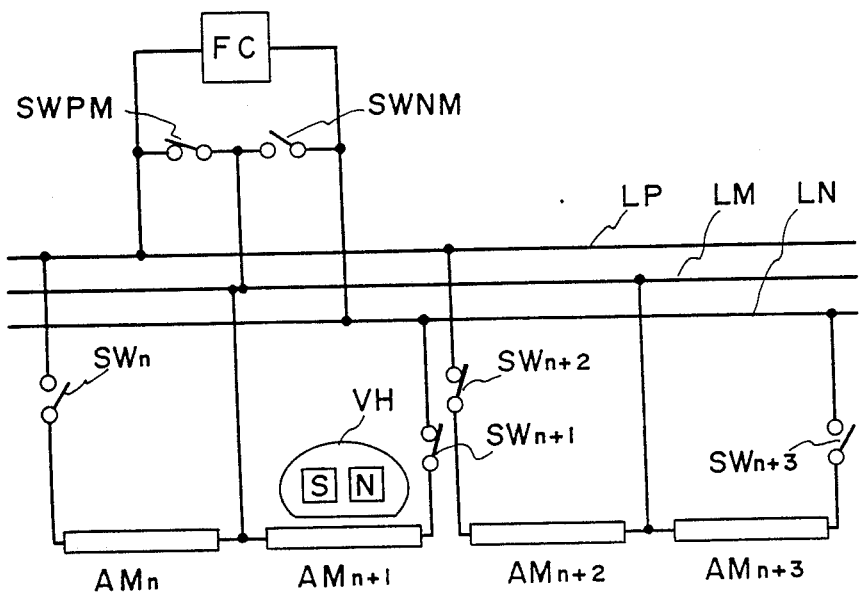

Next, as shown in FIG. 6, switch $SW_{n+2}$ is turned ON and switch $SW_n$ is turned OFF, at which time feeders LP and LM are short-circuited by switch SWPM. Since electricity is fed in this state, the switch $SW_n$ does not carry current and therefore can be turned OFF.

Figure 7:
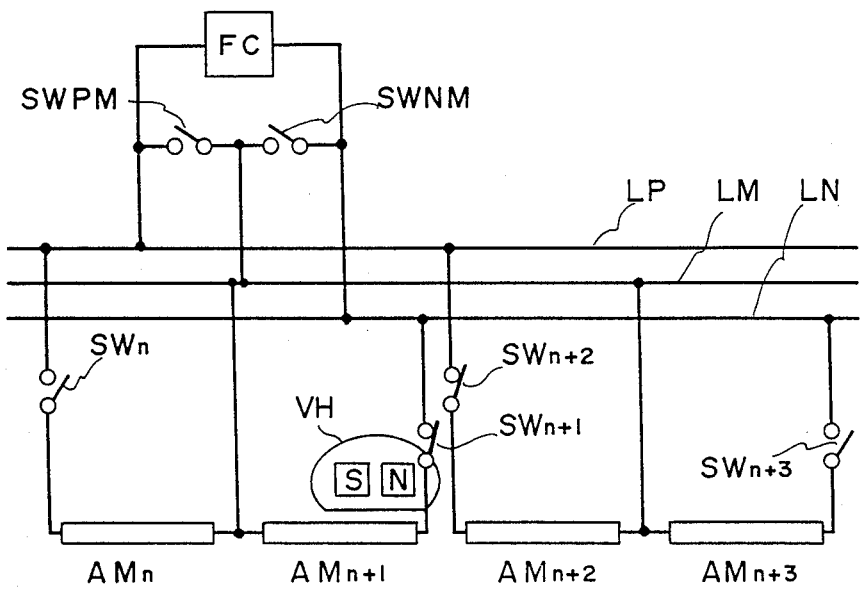

Next, when the vehicle VH has approached the next armature coil $AM_{n+2}$, as shown in FIG. 7, the switch SWPM is turned OFF. Under these conditions, the frequency converter FC feeds electricity through the following path: feeder LP→switch $SW_{n+2}$→armature coil $AM_{n+2}$→feeder LM→armature coil $AM_{n+1}$→ switch $SW_{n+1}$→feeder LN.

Figure 8:
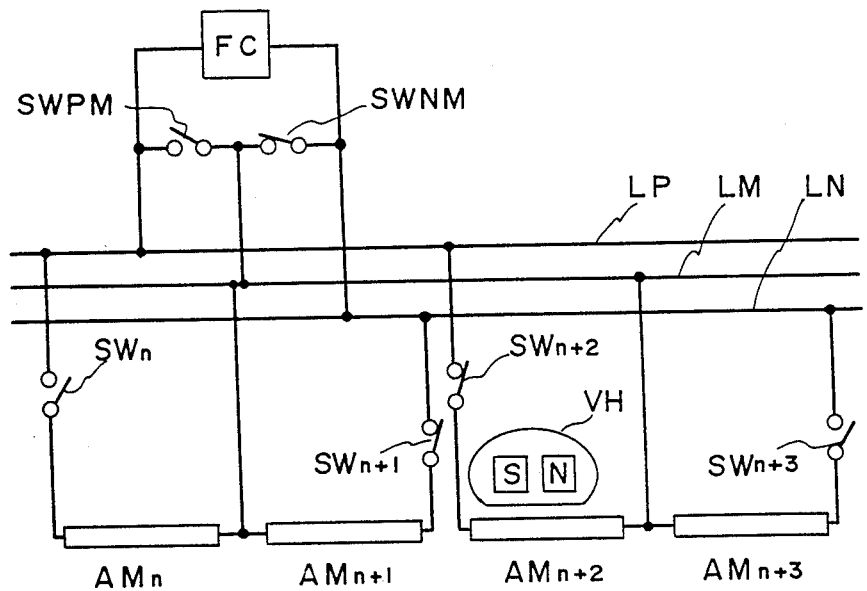

Similarly, at point $P_{n+2}$ (see FIG. 3) where the vehicle VH has moved in its entirety to the position of armature coil $AM_{n+2}$, as shown in FIG. 8, the switch SWNM is turned ON to short-circuit the feeders LN and LM. Under these conditions, the frequency converter FC feeds electricity through the following path: switch SWNM→feeder LM→armature coil $AM_{n+2}$→ switch $SW_{n+2}$→feeder LP.

Figure 9:
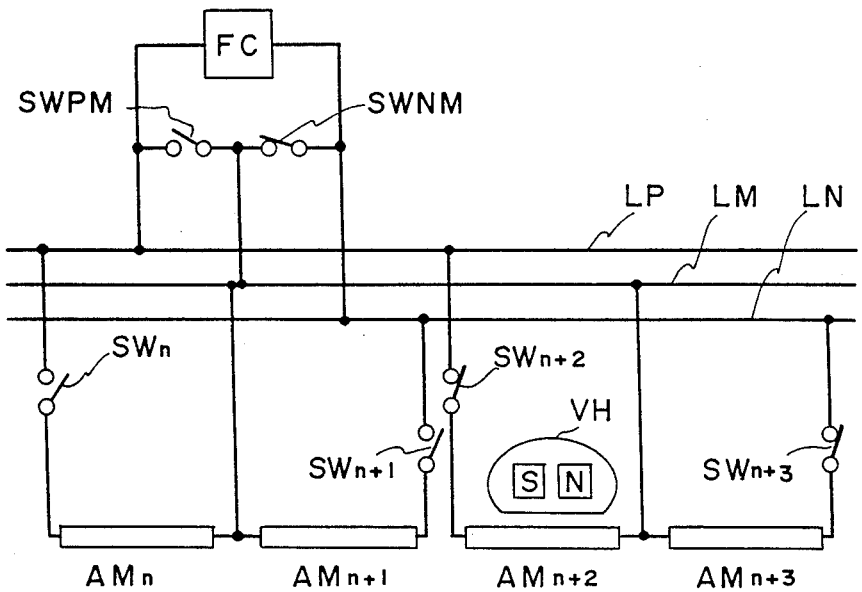

Thereafter, as shown in FIG. 9, switch $SW_{n+3}$ is turned ON and switch $SW_{n+1}$ is turned OFF. At this time, feeders LN and LM are short-circuited by switch SWNM. Since electricity is fed in this state, the switch $SW_{n+1}$ does not carry current and therefore can be turned OFF.

Figure 10:
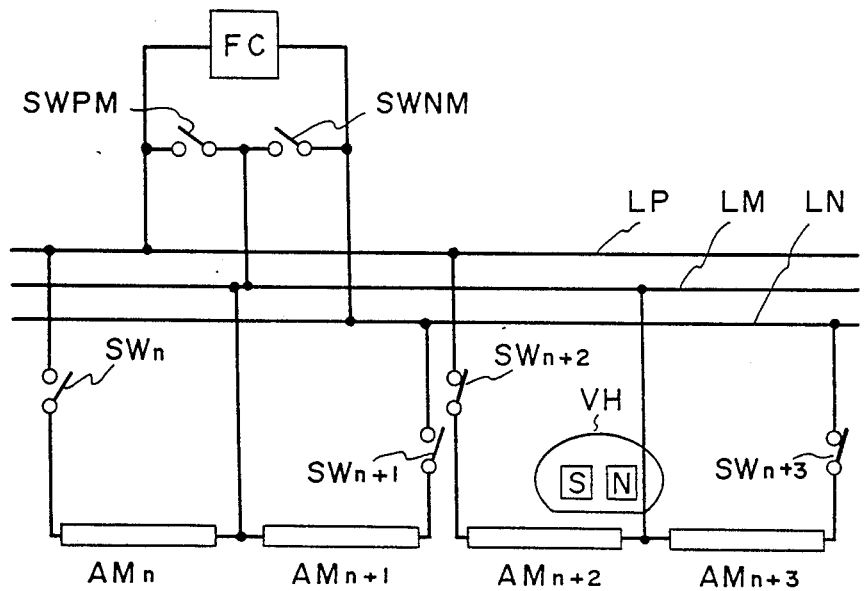
Figure 11:
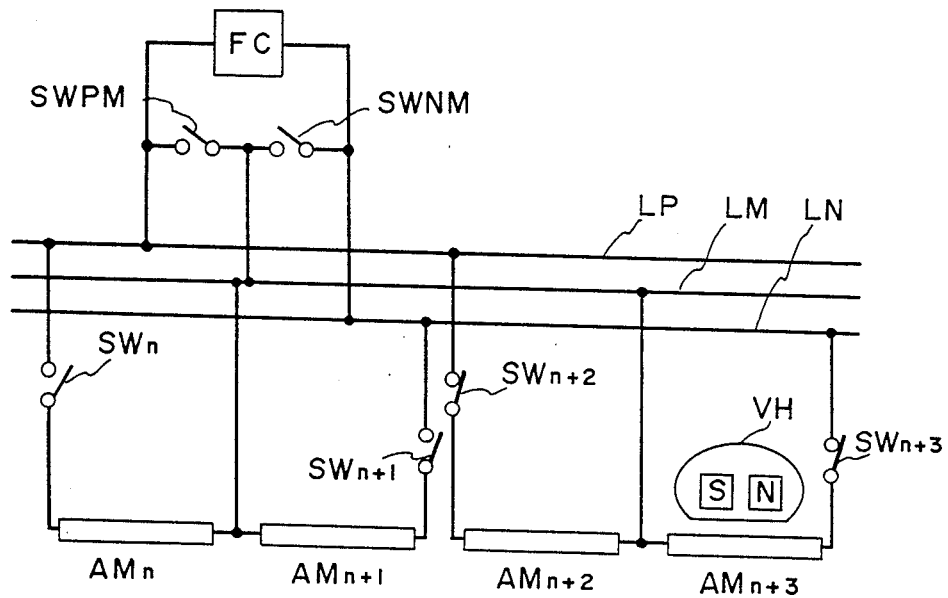

Next, when the vehicle VH has approached the next armature coil $AM_{n+3}$, as shown in FIG. 10, the switch SWNM is turned OFF. Under these conditions, the frequency converter FC feeds electricity through the following path: feeder LP→switch $SW_{n+2}$→armature coil $AM_{n+2}$→armature coil $AM_{n+3}$→switch $SW_{n+3}$→feeder LN.

The vehicle VH then shifts to armature coil $AM_{n+3}$ The switches are subsequently changed over in the manner described above.

Thus, first the feeders are short-circuited by the switches SWPM, SWNM, then the switches $SW_n$, $SW_{n+1}$, $SW_{n+2}$, $SW_{n+3}$ along the railway line are actuated, thereby enabling these switches to be turned off in the current-free state so that the switch contacts can be prevented from wearing out.

Furthermore, if it is arranged so that the switches SWPM, SWNM are turned ON immediately at the moment the vehicle has moved in its entirety onto one of the armature coils and these switches are turned OFF immediately before the vehicle VH enters the are of the next armature coil, then electricity will be fed to the minimum necessary number of armature coils at all times. This makes it possible to improve the feeding efficiency.

When each junction of the armature coils is connected directly to the feeder LM, as shown in FIG. 2, all of the armature coils can be grounded by connecting the feeder LM to ground. When the feeder LM is not grounded, on the other hand, all of the armature coils attain a potential which is the same as that of the feeder LM. Therefore, it is possible to connect each junction of the armature coils to the feeder LM via a switch and electrically isolate from the feeder LM those armature coils at which the vehicle VH is not present.

Figure 12:
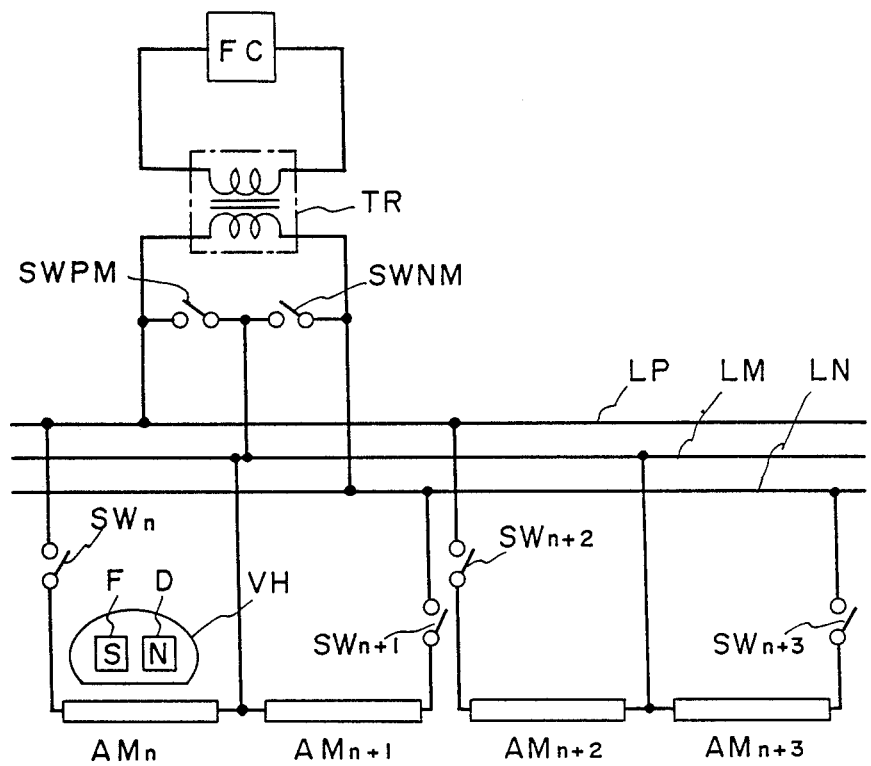
FIG. 12 is a view showing the construction of another embodiment of a linear motor feeder system according to the present invention.

FIG. 12 illustrates another embodiment in which the feeder circuit arrangement of FIG. 2 is additionally provided with a transformer TR inserted between the frequency converter FC and the feeders LP, LN. With this feeder system, the rated voltage of the linear motor and the rated voltage of the frequency converter FC can be set to different values by suitably selecting the voltage ratio of the transformer TR. For example, a high-voltage, low-current linear motor can be combined with a low-voltage, high-current frequency converter. Further, in this case the feeder LM and frequency converter FC can be grounded separately.

Figure 13:
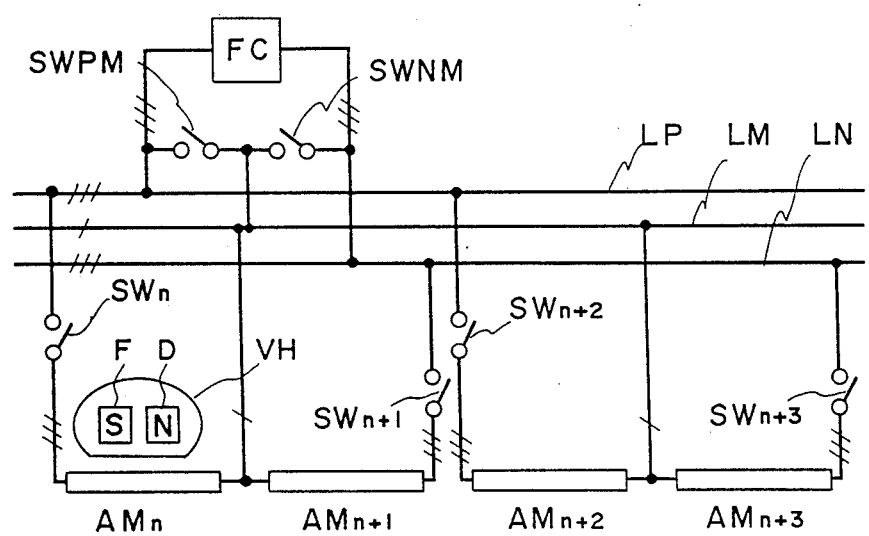
FIG. 13 is a view showing the construction of still another embodiment of a linear motor feeder system according to the present invention.

With a three-phase linear motor, single-phase armature coils, switches along the railway line, feeders, a frequency converter, short-circuiting switches and, depending upon the particular embodiment, a transformer, construct three sets of electrically independent feeder circuits. In this case, however, the three feeders of any one type from among the three feeders LP, three feeders LM and three feeders LN can be made one to reduce the total number of feeders. Such an embodiment is illustrated in FIG. 13, which illustrates a feeder circuit wherein the feeders LM are collected into a single line.

The three phases of the armature coils $AM_n$, $AM_{n+1}$, $AM_{n+2}$, $AM_{n+3}$ are Y-connected and their junctions are connected directly to the single feeder LM. The other end terminals of the armature coils are connected to the three-phase feeders LP, LM via the three-phase switches $SW_n$, $SW_{n+1}$, $SW_{n+2}$, $SW_{n+3}$. The frequency converter FC is connected to the feeders LP, LM in each of the phases. Thus, with a three-phase motor, the feeders of one type from among any of the three types of feeders each composed of three lines can be made one line to reduce the total number of feeders required.

According to the linear motor feed system of the present invention, a linear motor can be driven by a single frequency converter, so that the system of the invention is more economical than the prior-art feed system. In addition, since switches along the railway line are turned OFF in a current-free state, the contacts of the switches do not sustain wear. Furthermore, feed efficiency can be improved by suitably controlling the switches.

As many apparently widely different embodiments of the present invention can be made without departing from the spirit and scope thereof, it is to be understood that the invention is not limited to the specific embodiments thereof except as defined in the appended claims.

What we claim is:

1. A feeder system for a linear motor having field electrodes disposed on a vehicle and a plurality of stationary armature coils, comprising:

first, second and third feeder lines in parallel with one another;

a frequency converter connected across said first and second feeder lines for supplying electricity to the armature coils, wherein said armature coils are serially connected two-by-two to form sets of said armature coils such that a junction between two armature coils of each set is connected to said third feeder line, and such that opposing ends of each set, remote from said junction, are respectively connected to said first and second feeder lines through respective switches corresponding to the armature coils of said set;

a first short-circuiting switch disposed between said first and third feeder lines; and a second short-circuiting switch disposed between said second and third feeder lines.

2. The feeder system of claim 1, wherein a transformer is connected between said frequency converter and said first and second feeder lines.

3. The feeder system of claim 1, wherein each of said feeder lines includes a number of individual feeders corresponding to the number of phases being used in the linear motor.

* * * * *